(12) United States Patent
Hu et al.

(10) Patent No.: US 12,513,026 B2
(45) Date of Patent: Dec. 30, 2025

(54) AI-AUGMENTED CHANNEL ESTIMATION

(71) Applicant: Samsung Electronics Co., Ltd., Suwon-si (KR)

(72) Inventors: Yeqing Hu, Allen, TX (US); Yang Li, Plano, TX (US); Tiexing Wang, Plano, TX (US); Junmo Sung, Richardson, TX (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 364 days.

(21) Appl. No.: 18/183,114

(22) Filed: Mar. 13, 2023

(65) Prior Publication Data

US 2023/0388158 A1 Nov. 30, 2023

Related U.S. Application Data

(60) Provisional application No. 63/347,355, filed on May 31, 2022.

(51) Int. Cl.
H04L 25/02 (2006.01)

(52) U.S. Cl.
CPC ...... H04L 25/0254 (2013.01); H04L 25/0204 (2013.01); H04L 25/0256 (2013.01)

(58) Field of Classification Search
CPC ............. H04L 25/0254; H04L 25/0204; H04L 25/0256
USPC ...................................................... 370/328
See application file for complete search history.

(56) References Cited

U.S. PATENT DOCUMENTS

| | | | |
|---|---|---|---|
| 11,329,848 B2 | 5/2022 | Kons et al. | |
| 2015/0229493 A1* | 8/2015 | Lee | H04L 25/0234 370/252 |
| 2018/0367192 A1* | 12/2018 | O'Shea | G06N 3/08 |
| 2020/0099434 A1* | 3/2020 | Wang | H04B 7/0452 |
| 2021/0105155 A1 | 4/2021 | Kons et al. | |
| 2022/0376956 A1* | 11/2022 | Wesemann | H04L 25/0224 |
| 2023/0125699 A1* | 4/2023 | Chen | H04L 25/0224 375/262 |

FOREIGN PATENT DOCUMENTS

| | | |
|---|---|---|
| AU | 2021107497 A4 | 12/2021 |
| CN | 101039290 B | 8/2010 |
| CN | 107276933 B | 4/2020 |
| CN | 114826831 A | 7/2022 |

* cited by examiner

*Primary Examiner* — Faisal Choudhury

(57) ABSTRACT

A method includes determining estimated features comprising second order statistics based on at least one received signal. The method also includes classifying, using a machine learning network, each channel of the at least one received signal into a channel profile based on the estimated features. The method also includes obtaining multiple minimum mean square error (MMSE) channel estimation weights from a database based on the estimated features, the database storing (i) representative MMSE estimation weights and (ii) channel cluster representatives indexed by the estimated features. The method also includes applying a respective MMSE channel estimation weight for each channel.

20 Claims, 10 Drawing Sheets

| Cluster Center ACF | SNR 1 | SNR 2 | ... | SNR N |
|---|---|---|---|---|
| $r_{c1}$ | $w_{1,1}$ | $w_{1,2}$ | | $w_{1,N}$ |
| $r_{c2}$ | $w_{2,1}$ | $w_{2,2}$ | | $w_{2,N}$ |
| ... | | | | |
| $r_{cM}$ | $w_{M,1}$ | $w_{M,2}$ | | $w_{M,N}$ |

FIG. 7

AI-AUGMENTED CHANNEL ESTIMATION

CROSS-REFERENCE TO RELATED APPLICATIONS AND CLAIM OF PRIORITY

The present application claims priority to U.S. Provisional Patent Application Ser. No. 63/347,355 filed on May 31, 2022. The content of the above-identified patent document is incorporated herein by reference.

TECHNICAL FIELD

The present disclosure relates generally to wireless communication systems and, more specifically, the present disclosure relates to artificial intelligence (AI)-augmented channel estimation.

BACKGROUND

Channel estimation is an important factor in the success of wireless communication systems. Accurate estimation of the wireless channel enables high system throughput in most (if not all) wireless protocols and standards. Conventional minimum mean square estimator (MMSE) channel estimation techniques can have good performance, but typically have technical challenges. For example, MMSE involves significant computation complexity, such as estimation of second order statics (e.g., covariance matrices). This may be too computationally expensive for many devices and/or may be challenging to obtain, especially in high noise and high mobility cases.

SUMMARY

The present disclosure relates to wireless communication systems and, more specifically, the present disclosure relates to AI-augmented channel estimation.

In one embodiment, a method includes determining estimated features comprising second order statistics based on at least one received signal. The method also includes classifying, using a machine learning network, each channel of the at least one received signal into a channel profile based on the estimated features. The method also includes obtaining multiple minimum mean square error (MMSE) channel estimation weights from a database based on the estimated features, the database storing (i) representative MMSE estimation weights and (ii) channel cluster representatives indexed by the estimated features. In some cases, the disclosed technology can utilize one or more databases, and the one or more databases can be configured to store (i) representative MMSE estimation weights and (ii) channel cluster representatives indexed by the estimated features. The method also includes applying a respective MMSE channel estimation weight for each channel.

In another embodiment, a device includes a transceiver and a processor operably connected to the transceiver. The processor is configured to: determine estimated features comprising second order statistics based on at least one received signal; classify, using a machine learning network, each channel of the at least one received signal into a channel profile based on the estimated features; obtain multiple MMSE channel estimation weights from a database based on the estimated features, the database storing (i) representative MMSE estimation weights and (ii) channel cluster representatives indexed by the estimated features; and apply a respective MMSE channel estimation weight for each channel.

In yet another embodiment, a non-transitory computer readable medium includes program code that, when executed by a processor of a device, causes the device to: determine estimated features comprising second order statistics based on at least one received signal; classify, using a machine learning network, each channel of the at least one received signal into a channel profile based on the estimated features; obtain multiple MMSE channel estimation weights from a database based on the estimated features, the database storing (i) representative MMSE estimation weights and (ii) channel cluster representatives indexed by the estimated features; and apply a respective MMSE channel estimation weight for each channel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates an example of a database for use with the framework of FIGURE according to embodiments of the present disclosure;

DETAILED DESCRIPTION

Figure 1:
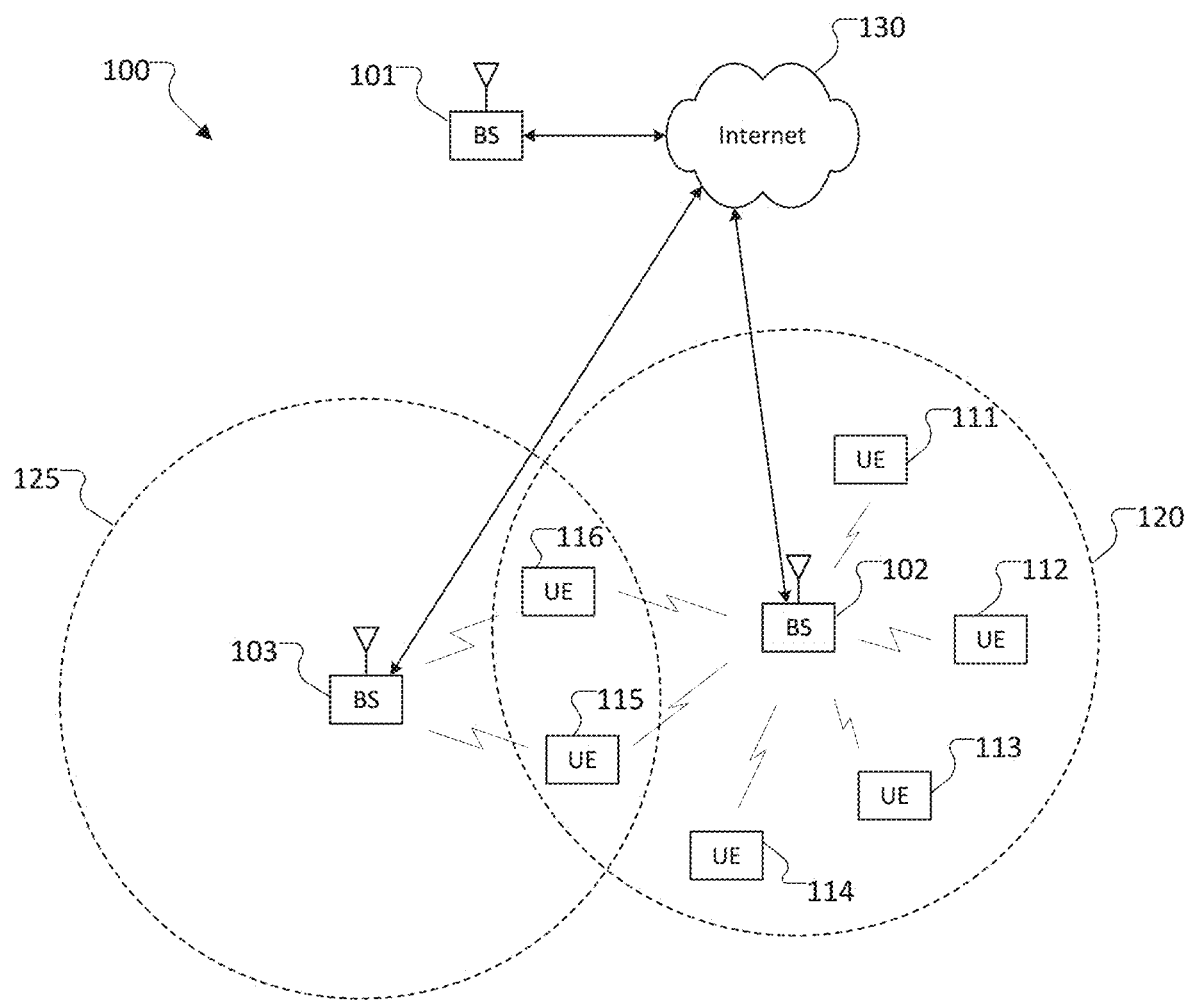
FIG. 1 illustrates an example wireless network according to embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another or can operate as standalone schemes. Certain embodiments of the disclosure may be derived by utilizing a combination of several of the embodiments listed below. Also, it should be noted that further embodiments may be derived by utilizing a particular subset of operational steps as disclosed in each of these embodiments. This disclosure should be understood to cover all such embodiments.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, analog beam forming, and large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
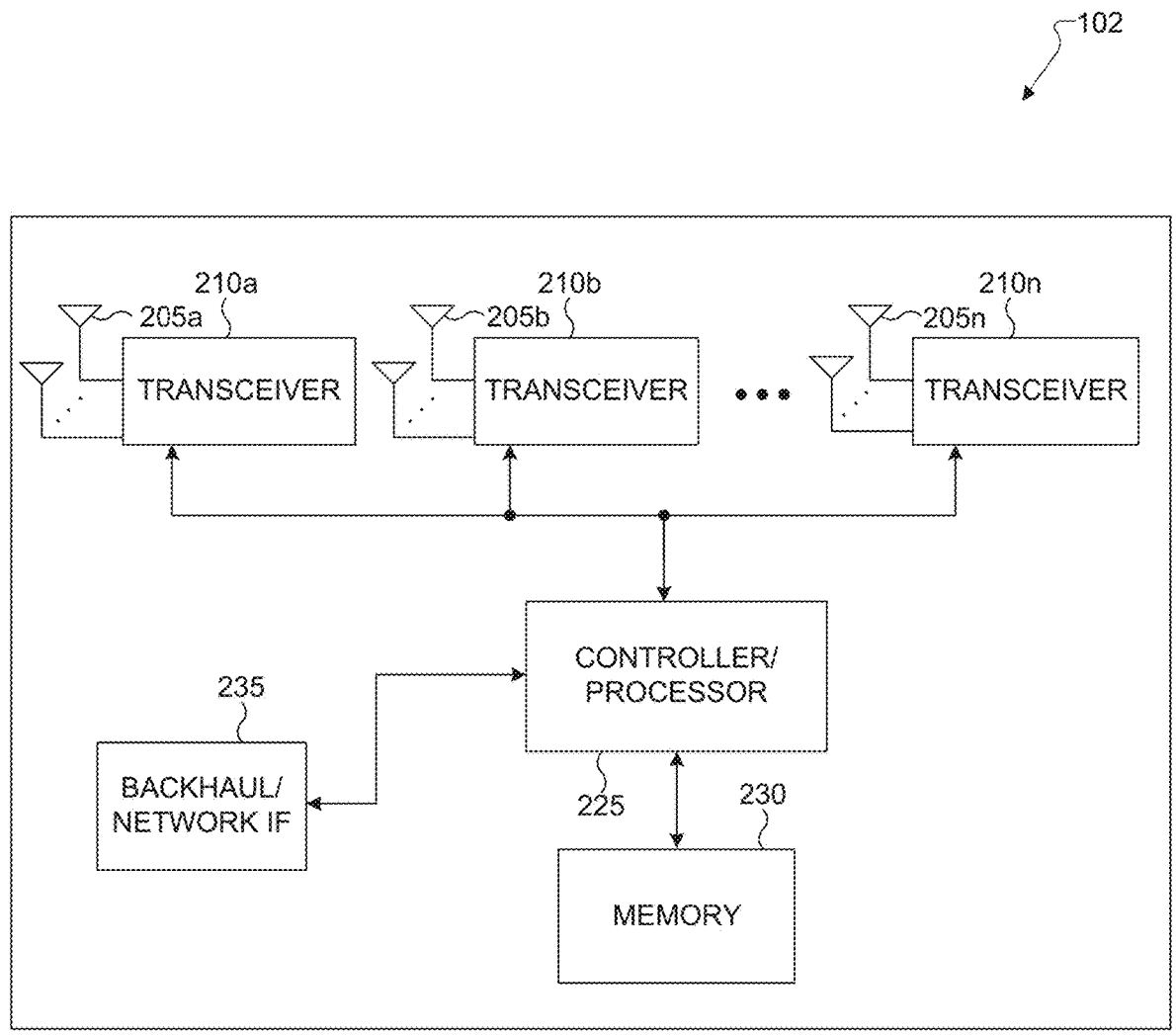
FIG. 2 illustrates an example gNB according to embodiments of the present disclosure.
Figure 3:
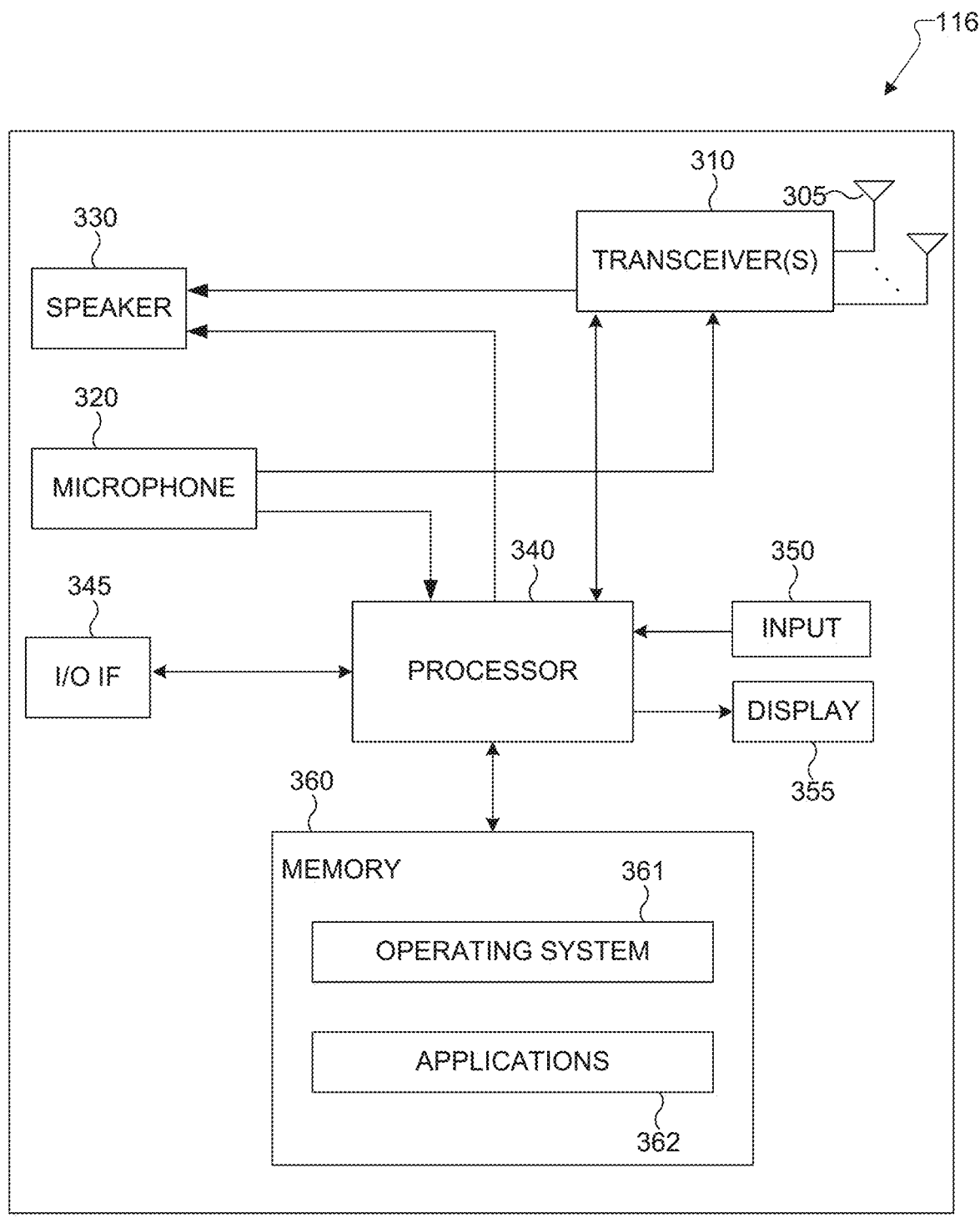
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the gNBs 101-103 includes circuitry, programming, or a combination thereof for performing AI-augmented channel estimation. In certain embodiments, one or more of the UEs 111-116 includes circuitry, programming, or a combination thereof for performing AI-augmented channel estimation.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support AI-augmented channel estimation. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for AI-augmented channel estimation. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 (which includes for example, a touchscreen, keypad, etc.) and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
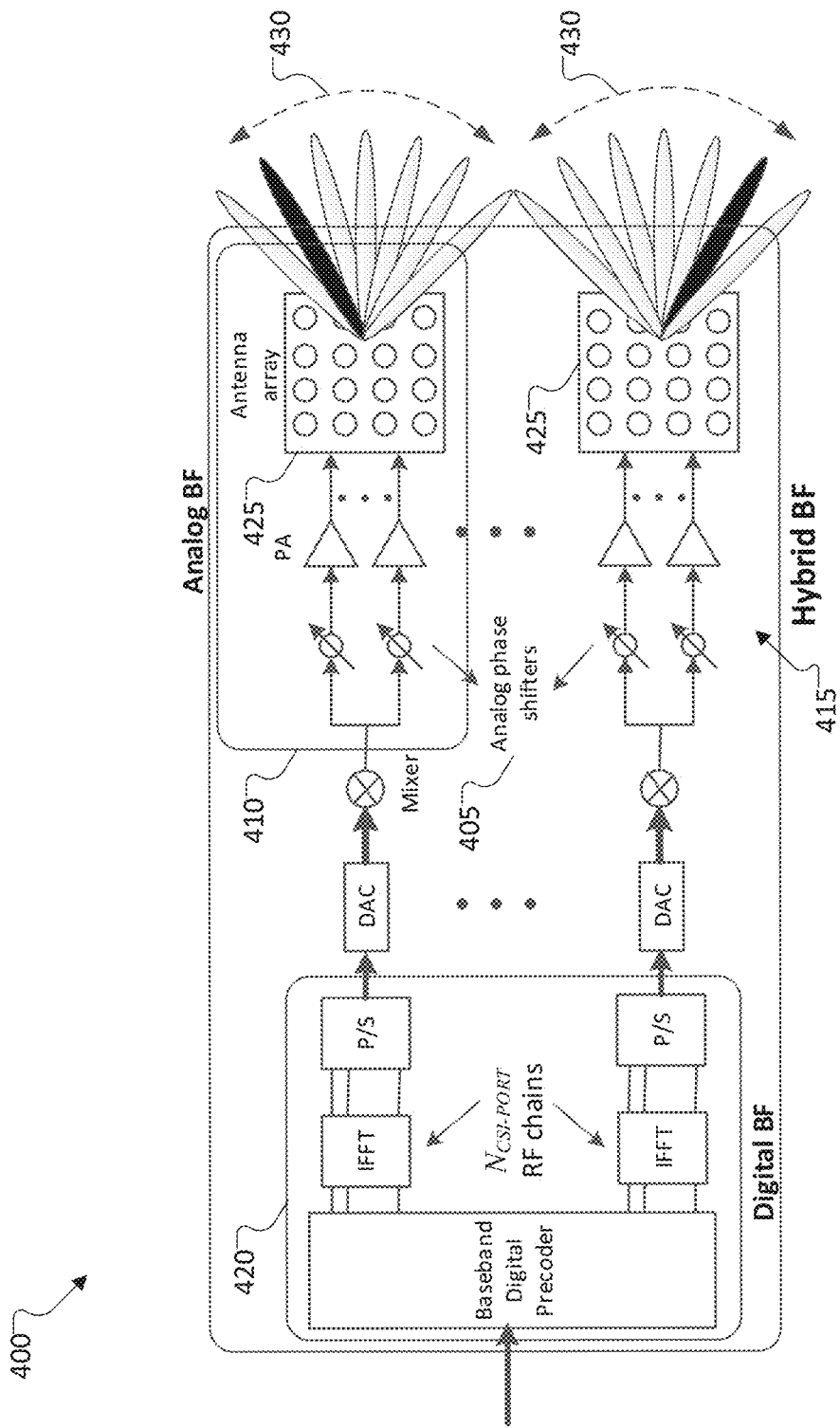
FIG. 4 illustrates an example beamforming architecture according to embodiments of the present disclosure.

FIG. 4 illustrates an example beamforming architecture 400 according to embodiments of the present disclosure. The embodiment of the beamforming architecture 400 illustrated in FIG. 4 is for illustration only. FIG. 4 does not limit the scope of this disclosure to any particular implementation of the beamforming architecture 400. In certain embodiments, one or more of gNB 102 or UE 116 can include the beamforming architecture 400. For example, one or more of antenna 205 and its associated systems or antenna 305 and its associated systems can be configured the same as or similar to the beamforming architecture 400.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of analog-to-digital converts/digital-to-analog converts (ADCs/DACs at mmWave frequencies)).

In the example shown in FIG. 4, the beamforming architecture 400 includes analog phase shifters 405, an analog beamformer (BF) 410, a hybrid BF 415, a digital BF 420, and one or more antenna arrays 425. In this case, one CSI-RS port is mapped onto a large number of antenna elements in antenna arrays 425, which can be controlled by the bank of analog phase shifters 405. One CSI-RS port can then correspond to one sub-array which produces a narrow analog beam through analog beamforming by analog BF 410. The analog beam can be configured to sweep 430 across a wider range of angles by varying the phase shifter bank 405 across symbols or subframes. The number of sub-arrays (equal to the number of RF chains) is the same as the number of CSI-RS ports NCSI-PORT. The digital BF 420 performs a linear combination across NCSI-PORT analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

Additionally, the beamforming architecture 400 is also applicable to higher frequency bands such as >52.6 GHz (also termed the FR4). In this case, the beamforming architecture 400 can employ only analog beams. Due to the O2 absorption loss around 60 GHz frequency (~10 decibels (dB) additional loss @100 m distance), larger numbers of and sharper analog beams (hence larger number of radiators in the array) will be needed to compensate for the additional path loss.

Using the beamforming architecture 400, the gNB 102 could utilize one or multiple transmit beams to cover the whole area of one cell. The gNB 102 may form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may make it feasible for the gNB 102 to provide coverage with a single transmit beam, i.e., ensure adequate received signal quality at all UE locations within the coverage area via the usage of a single transmit beam. In other words, at lower transmit signal carrier frequencies, the transmit power amplification provided by the transmit beam with a width large enough to cover the area may be sufficient to overcome the propagation losses to ensure adequate received signal quality at all UE locations within the coverage area. However, at higher signal carrier frequencies, the transmit beam power amplification corresponding to the same coverage area may not be sufficient to overcome the higher propagation losses, resulting in a degradation of received signal quality at UE locations within the coverage area. In order to overcome such a received signal quality degradation, the gNB 102 may form a number of transmit beams, each providing coverage over a region narrower than the overall coverage region, but providing the transmit power amplification sufficient to overcome the higher signal propagation loss due to the usage of higher transmit signal carrier frequencies. The UE 116 may also form receive beams to increase the signal-to-interference-and-noise ratio (SINR) at the receiver. Likewise, in the uplink, the UE 116 may form transmit beams and the gNB 102 may form receive beams.

To assist the UE 116 in determining its RX and/or TX beam, a beam sweeping procedure can be employed, which includes the gNB 102 transmitting a set of transmit beams to sweep the cell area and the UE 116 measuring the signal quality on different beams using the UE's receive beams. To facilitate candidate beam identification, beam measurement and beam quality reporting, the gNB 102 configures the UE 116 with one or more RS resources (e.g., SS Block, Periodic/Aperiodic/Semi-Persistent CSI-RS resources or CRIs) corresponding to a set of TX beams. An RS resource refers to a reference signal transmission on a combination of one or more time (OFDM symbol)/frequency (resource element)/spatial (antenna port) domain locations. For each RX beam, the UE 116 reports different TX beams received using that RX beam, ranked in order of signal strength (RSRP) and optionally CSI (CQI/PMI/RI)). Based on the UE's measurement report feedback, the gNB 102 indicates the UE 116 with one or more Transmission Configuration Indicator (TCI) states for reception of PDCCH and/or PDSCH.

In 5G, the UE 116 can be equipped with multiple antenna elements. There can also be one or more antenna modules fitted on the UE 116, where each module can have one or more antenna elements. Beamforming can be an important factor when the UE 116 tries to establish a connection with the gNB 102. To compensate for the narrower analog beamwidth in mmWave, analog beams sweeping can be employed to enable wider signal reception or transmission coverage for the UE 116. A beam codebook comprises a set of codewords, where a codeword is a set of analog phase shift values, or a set of amplitude plus phase shift values, applied to the antenna elements, in order to form an analog beam.

As discussed above, channel estimation is an important factor in the success of wireless communication systems. Accurate estimation of the wireless channel enables high system throughput in most (if not all) wireless protocols and standards. For example, gNB channel estimation can be critical for achieving high spectral efficiency and reliable cell coverage, as the estimated channel state information (CSI) is used for many operations. In particular, for downlink data transmission, the gNB often relies on the sounding reference signal (SRS) to estimate the CSI in a time division duplex (TDD) system, and uses it to perform scheduling and beamforming weight calculation. For uplink data reception, the gNB obtains the CSI via demodulation reference signals (DMRS), and uses it for equalization. The channel estimation typically includes two stages of operation. First, a noisy estimate is obtained by removing the reference signals (RS). Then, the noisy estimate is refined so it can be used in subsequent modules or processing. The refinement stage is important, and usually requires carefully designed algorithms.

In conventional signal processing, the MMSE estimator is optimal in the sense of the mean square error (MSE). The MMSE estimator exploits the second order channel statistics such as the covariance and cross-correlation matrices, and SNR/noise power. Conventional MMSE channel estimation techniques can have good performance, but typically have technical challenges.

For example, consider an OFDM system. For an arbitrary user at one snapshot, $\hat{x}(m)$ is the transmitted RS pilot at the m-th subcarrier, and $y_k(m)$ is the received signal at the corresponding resource on the k-th gNB antenna element. The first step of channel estimation is to apply the least square (LS) algorithm to remove the RS, and obtain the initial noisy estimate as:

$$\hat{h}_k(m) = y_k(m)/\hat{x}(m).$$

Note that multiple users can be multiplexed on the same time-frequency resource by the Zadoff-Chu (ZC) sequence and cyclic shift (CS), hence $y_k(m)$ contains other users' channel information, in addition to being impaired by varying noise. Therefore, the estimated channel $\hat{h}_k(m)$ must be further refined before it can be applied for transmission or reception. For a single snapshot of the channel, the goal is to obtain a refined channel estimate $\hat{\tilde{h}}_k(m)$ as close as possible to the ground truth channel $h_k(m)$.

The conventional MMSE estimator exploits the second order statistics, e.g., the correlation among subcarriers or antennas, to refine the estimation. One example of the estimate can be written as:

$$\hat{\tilde{h}}_k(m) = w_{freq} \hat{H}_k(m) w_{Ant}^H,$$

where

-continued $$\hat{H}_k(m) = \begin{bmatrix} \hat{h}_{k-p}(m-q), \hat{h}_{k-p+1}(m-q), \ldots \hat{h}_{k+p}(m-q) \\ \vdots \\ \hat{h}_{k-p}(m+q), \hat{h}_{k-p+1}(m+q), \ldots \hat{h}_{k+p}(m+q) \end{bmatrix}.$$

In this example, the initial estimates from 2q+1 pilot subcarriers and 2p+1 antennas are combined jointly to obtain the refined estimate on subcarrier m and antenna k. The frequency domain and antenna domain estimation weights ($w_{freq}$ and $w_{Ant}^H$, respectively) are computed by exploiting the second order statistics on the two domains. This can be written as:

$$w = r_{h\hat{h}} r_{\hat{h}\hat{h}}^{-1},$$

where $r_{h\hat{h}}$ is the cross correlation between the true channel and the initial noisy estimate, and $R_{\hat{h}\hat{h}}$ is the covariance matrix of the initial noisy estimate.

However, these second order statistics are usually difficult to calculate for several reasons, including (i) the pilots/RS are transmitted sparsely in time and frequency domain, (ii) the RS can exhibit varying SNR due to power control and environment change, and (iii) the channel can experience non-stationarity especially in a mobility scenario. In some cases, the complexity of MMSE is more than double that of other channel estimation techniques. This may be too computationally expensive for many commercial systems. Also, covariance matrices are averaged across frequency and time samples, to average out the impact of noise and channel dynamics. When the received channel reference signal exhibits a low signal-to-noise ratio (SNR), estimation of the covariance matrices is challenging. In addition, when the channel is in a high mobility scenario, covariance matrix estimation may not have enough time samples to converge to stable values.

Some recent techniques employ neural networks to learn how to refine the noisy estimate. A common method is to split the noisy channel estimate into real and imaginary parts, feed the parts into a neural network, and use MSE as the cost function. However, these generic machine learning methods typically do not utilize the signal structure or prior knowledge for channel estimation, and underperform the MMSE channel estimation techniques. In addition, due to the computation complexity, they usually suffer from larger processing latency.

To address these and other issues, this disclosure provides systems and methods for AI-augmented channel estimation. As described in more detail below, the disclosed embodiments include a framework in which machine learning techniques are deployed to classify the channels and aid the MMSE estimator to determine the second order statistics, the estimation weights, or both. In particular, the disclosed embodiments determine, based on machine learning classification, an estimation of second order statistics, and then use the estimated second order statistics to facilitate determining MMSE channel estimation weights. In some embodiments, the second order statistics can be determined based on channel profiles. In addition, the disclosed embodiments apply a respective MMSE channel estimation weight for each channel profile. In this way, the strength of machine learning classification and the domain knowledge of channel estimation can both be harvested. The disclosed embodiments improve channel estimation with low complexity and better performance algorithms.

Some of the embodiments discussed below are described in the context of a gNB in a wireless communication system. Of course, these are merely examples. It will be understood that the principles of this disclosure may be implemented in any number of other suitable contexts or systems.

Figure 5:
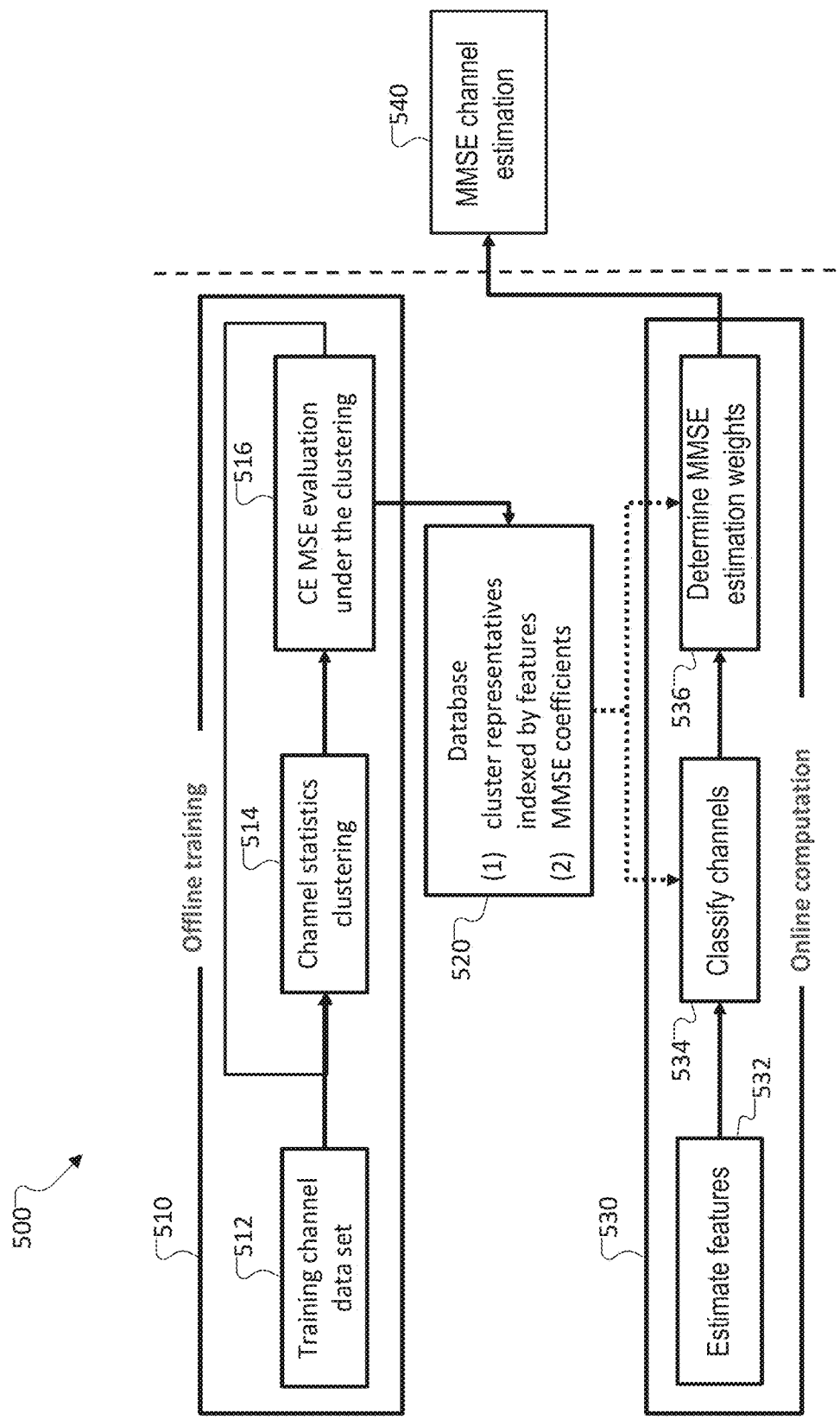
FIG. 5 illustrates an example framework for performing AI augmented channel estimation according to embodiments of the present disclosure.

FIG. 5 illustrates an example framework 500 for performing AI augmented channel estimation according to embodiments of the present disclosure. For ease of explanation, the framework 500 is described as being implemented in the gNB 102 to perform AI augmented channel estimation. However, this is merely one example, and the framework 500 could be implemented using any other suitable process (es) and device(s) and in any other suitable system(s).

As shown in FIG. 5, the framework 500 includes an offline training process 510, generation of a database 520, and an online computation process 530. Based on the framework 500, the gNB 102 utilizes AI or ML classification methods to facilitate the second order statistics estimation, which is then used as an input to facilitate MMSE channel estimation. Using the framework 500, the gNB 102 identifies that the second order statistics are determined by the channel profile (e.g., the power delay profile, the angular spread profile, and the like). Therefore, channels with a similar profile share a similar MMSE estimation weight. This insight enables the gNB 102 to classify the channels according to their profiles, and for each channel profile, apply the corresponding estimation weight.

In the offline training process 510, the gNB 102 generates or obtains a training channel data set 512. The training channel data set 512 contains multiple channel frequency domain responses for multiple channel profiles having different delays, angular profiles, and/or speed profiles. The channel frequency domain responses comprising the training channel data set 512 can be obtained from any suitable source or by any suitable process. For example, the training channel data set 512 may be generated empirically over time, or obtained from another source.

Once the training channel data set 512 is obtained, the gNB 102 performs a channel statistics clustering operation 514 to classify (i.e., group) the channel profiles of the training channel data set 512 into a few clusters or classes. The channel profiles are clustered together based on their similarity with respect to one or more metrics. Each cluster is represented by a center channel profile. Within each cluster, the various channel profiles are very similar to the center channel profile. In this type of classification, one or more machine learning techniques can be applied to perform the classification. In some embodiments, unsupervised learning is used.

One example metric that can be used to cluster the channel profiles is auto-correlation function (ACF). The ACF is a common second order statistic that is frequently used in MMSE estimation. To cluster the channel profiles by ACF, the gNB 102 can define an ACF vector of length K, with channel profile i, as $r_i=[r(1), r(2), \ldots r(K)]$. Then, the ACF similarity between channel profile i and j can be defined as the cosine similarity, expressed as:

$$\text{ACF similarity}(i, j) = \frac{r_i r_j^H}{\|r_i\| \|r_j\|}.$$

Figure 6:
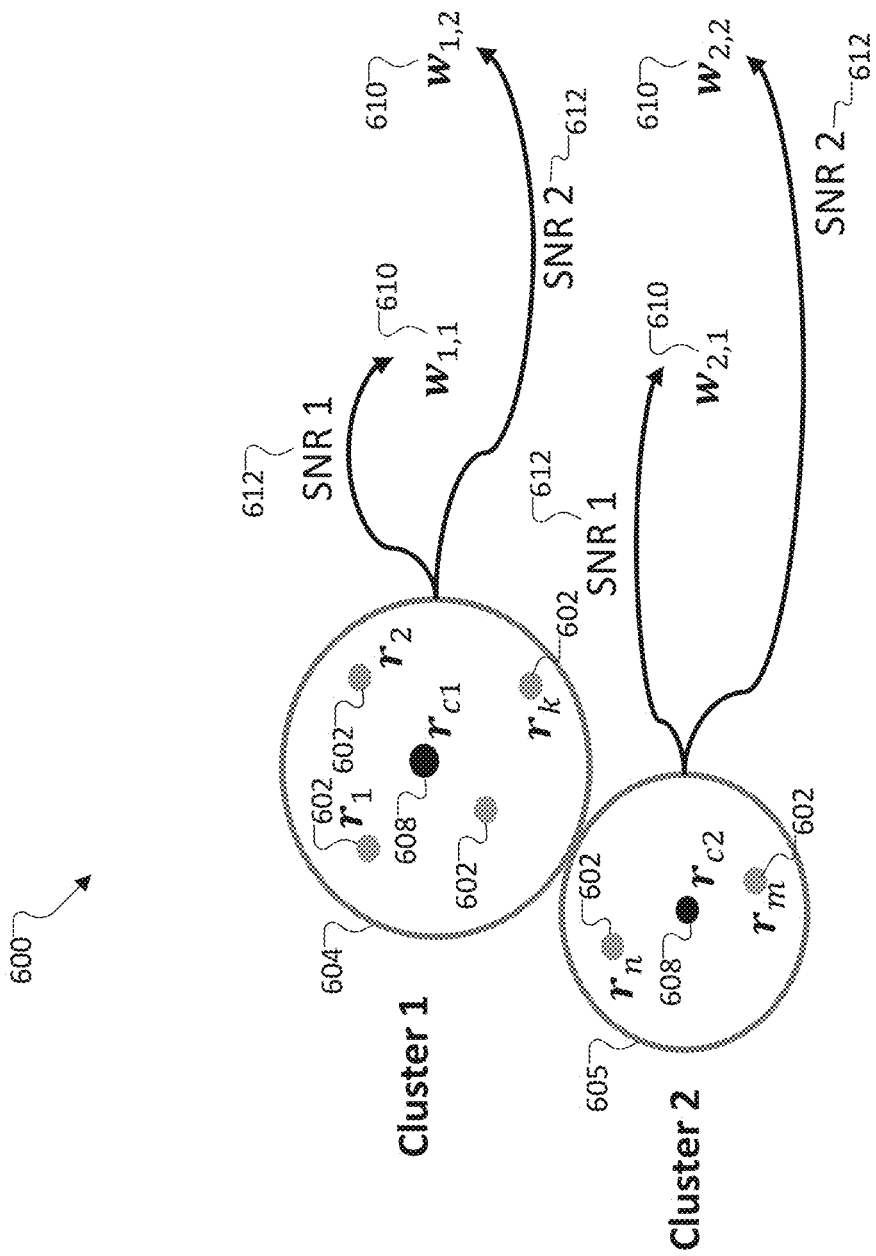
FIG. 6 illustrates an example illustration of clustering channel profiles by auto correlation function (ACF) similarity according to embodiments of the present disclosure.

FIG. 6 illustrates an example illustration 600 of clustering channel profiles by ACF similarity according to embodiments of the present disclosure. As shown in FIG. 6, multiple channel profiles 602 are represented as dots in the illustration 600. In particular, each dot represents the ACF of one channel profiles 602. The channel profiles 602 are grouped together within clusters 604-605, where the channel profiles 602 within each cluster 604-605 have similar ACF values. As discussed above, cosine similarity can be used to group the channel profiles 602. For example, the channel profiles 602 within the cluster 604 have similar ACF values, and the channel profiles 602 within the cluster 605 have similar ACF values. Each cluster 604-605 of channel profiles 602 is represented by one of the channel profiles 602 at or near the center of the cluster 604-605; this representative channel profile 602 is referred to as the center channel profile 608.

For each cluster of channel profiles 602, the gNB 102 computes the corresponding channel estimation weights, which are coefficients used in MMSE estimation. For example, as shown in FIG. 6, for each cluster 604-605 of channel profiles 602, the gNB 102 can determine various channel estimation weights 610, which can later be applied in channel estimation. The channel estimation weights 610 are identified in FIG. 6 as $w_{i,j}$, where i is an index representing the cluster 604-605, and j is an index representing different scenarios of a noise parameter, such as SNR 612.

Once the channel profiles 602 have been clustered and the channel estimation weights 610 have been determined, the gNB 102 can perform a channel estimation MSE evaluation process 516. During the channel estimation MSE evaluation process 516, the gNB 102 calculates a MSE for each channel profile 602 by applying the channel estimation weights 610. The calculated MSE values are then evaluated to determine if the clustering is reasonable based on the performance indicated by the MSE. This can be used to train or tune the clustering model.

During the offline training process 510, the gNB 102 generates the database 520 to store the channel estimation weights 610. The database 520 contains cluster representatives that are indexed by features, where the features are related to each cluster of channel profiles 602. Herein, the features are second order statistics (e.g., ACF, SNR, and the like) computed from channel data that can identify different channel profiles 602.

FIG. 7 illustrates an example of the database 520 according to embodiments of the present disclosure. As shown in FIG. 7, the structure of the database 520 is in the form of a data table that is indexed on two features—ACF and SNR. The database 520 includes a 'Cluster Center ACF' column 702 and multiple 'SNR' columns 704a-704n. Each row of the database 520 corresponds to an ACF value $r_{cx}$ of one of the center channel profiles 608 shown in FIG. 6. Each of the 'SNR' columns 704a-704n corresponds to one of the SNRs 612 shown in FIG. 6. For a given ACF value and a given SNR 612, the database 520 maps to one or more channel estimation weights 610 ($w_{m,n}$) of desired length.

Although FIGS. 6 and 7 illustrate example details of classifying channel profiles into clusters and determining channel estimation weights, various changes may be made to FIGS. 6 and 7. For example, features other than ACF and SNR can be used in the clustering and channel estimation weight calculations. As a particular example, the raw channel frequency response (or its down-sampled version) or its processed time-domain response can also be used as input to classify the channel profiles. When classifying the channel profiles into clusters, various techniques (including machine learning aided techniques and those that do not use machine learning) can be used. For instance, non-machine learning methods can be used to design and classify the first-level SNR regions or delay spread regions (which can be inferred through ACF, raw channel frequency response, or its time-domain response), and machine learning aided classification methods (such as K-medoids, K-mean, complete linkage, support vector machine (SVM), decision tree, Adaboost, reinforcement learning, or the like) can be deployed to further classify the channel profiles of each region into finer clusters. In some embodiments, conventional methods and machine learning methods can be directly deployed for clustering without the aid of each other. Also, although FIG. 6 shows two clusters 604-605, the channel space can be grouped into more than two clusters.

Turning again to FIG. 5, after the offline training process 510 has been performed and the database 520 has been generated, the gNB 102 can perform the online computation process 530 to determine the MMSE channel estimation weights for MMSE channel estimation in online signal processing.

In the online computation process 530, the gNB performs a feature estimation process 532. In the feature estimation process 532, the gNB 102 computes one or more features from the initial noisy channel estimates of the received signal. In some embodiments, the initial noisy channel estimates of the received signal include the SRS of each channel. From the SRS, the gNB 102 can compute an estimation of features including second order statistics, such as ACF, SNR, covariance matrix, cross-correlation matrix, and the like.

One example of the computed features is the ACF discussed above. When the gNB 102 computes the ACF from the noisy channel estimates, the gNB 102 can compute the ACF based on the average of all antennas, or based on an average across selected antennas. The antenna selection can be based on SNR and antenna polarizations. For example, if the strongest SNR of two antenna polarizations differ within a threshold, the ACF can be averaged across $\alpha_1$ antennas from polarization 1, and $\alpha_2$ antennas from polarization 2. The values of $\alpha_1$ and $\alpha_2$ can be equal or different according to the SNR distribution. On the other hand, if the strongest SNR of the two antenna polarizations differ by more than the threshold, only antennas on the stronger polarization are selected for averaging. Also, in some embodiments, the ACF can be computed for a few selected lags, instead of the entire estimation weight length.

Another example of the computed features is the SNR. The SNR can be computed per antenna, or jointly across all antennas. If a per-antenna SNR is computed, different SNR metrics can be used to map to the database 520, such as average SNR, SNR of a certain percentile, largest (or smallest) SNR, and the like.

After the features are estimated, the gNB 102 performs a channel classification process 534. In the channel classification process 534, the gNB 102 uses the estimated features and the database 520 to classify each observed channel of the received signal into one or more channel profiles. In particular, the computed features are mapped to the database 520 to see which cluster of coefficients can be used. For example, for a particular computed ACF, the gNB 102 can compare the computed ACF value to the ACF values $r_{cx}$ of the database 520 shown in FIG. 7 to determine the best correlation. Each ACF value $r_{cx}$ shown in the database 520 corresponds to one of the center channel profiles 608 shown in FIG. 6. Thus, by comparing the computed ACF from the noisy channel estimates, the gNB 102 can classify each channel of the received signal into one or more channel profiles. In some embodiments, the gNB 102 can use AI or ML classification methods such as supervised learning to perform the classification. For example, the classification methods can include support vector machine (SVM), decision tree, Adaboost classifiers, or the like.

Once the channels of the received signal have been classified into channel profiles, the gNB 102 can then determine one or more MMSE channel estimation weights 536 for use in MMSE channel estimation. In some embodiments, the gNB 102 can use the determined channel profile, the database 520, and the estimated features to determine the corresponding MMSE channel estimation weights 536. For example, assume another feature estimated from the noisy channel estimates is SNR. The gNB 102 can use the determined channel profile, the SNR, and the database 520 to determine a MMSE channel estimation weight. As a particular example using the database 520 shown in FIG. 7, if the determined channel profile correlates to the ACF value $r_{c2}$ and the estimated SNR correlates to the SNR 2 of column 704b, then the gNB 102 can obtain the channel estimation weight $w_{2,1}$ to use for the MMSE channel estimation weight 536.

In some embodiments, during the online computation process 530, if the gNB 102 encounters a channel profile that does not correlate well to predefined clusters represented in the database 520, the gNB 102 can compute linear combinations of multiple cluster center ACFs or switch back to a default (e.g., moving average) technique.

For example, during the channel classification process 534, the gNB 102 can measure 'distance' between the observed channel and the cluster center by using the correlation between the selected estimated ACF lags, e.g., $\hat{r}_i$ and $\hat{r}_{cx}$. To determine how good the correlation is, a set of correlation thresholds can be used, e.g., $\{c_0, c_1, c_2\}$, where $c_0 > c_1 > c_2$.

When the maximum correlation between the $\hat{r}_i$ and all cluster centers $$\left(\max_x \{\langle \hat{r}_i, \hat{r}_{cx} \rangle\}\right)$$

is greater than $c_0$, $\hat{r}_i$ can be considered as being close to a cluster center in the database 520, and the gNB 102 can classify the observed channel as described above.
When $$c_2 < \max_x \{\langle \hat{r}_i, \hat{r}_{cx} \rangle\} < c_0,$$

it may indicate the observed channel is not close to any cluster center represented in the database 520, but has reasonable correlation with two or more of them. The actual representative ACF may then be computed by a linear combination of multiple cluster centers. The candidate cluster centers can be selected such that $x \in \{\langle \hat{r}_i, \hat{r}_{cx} \rangle > c_1\}$, and the combining coefficients can be chosen proportionally to the correlation, which can be expressed by the following:

$$\hat{r}_{comb} = \frac{\sum_x r_{cx} \langle \hat{r}_i, \hat{r}_{cx} \rangle}{\sum_x \langle \hat{r}_i, \hat{r}_{cx} \rangle}$$

However, when $$\max_x \{\langle \hat{r}_i, \hat{r}_{cx} \rangle\} < c_2,$$

it may indicate the observed channel is far from any predefined cluster center, and the default technique (e.g., moving average) can be used.

Once the MMSE channel estimation weights 536 have been determined in the online computation process 530, the gNB 102 can perform MMSE channel estimation 540 by applying the respective MMSE channel estimation weight for each channel. Here, the MMSE channel estimation 540 can include any suitable MMSE channel estimation technique, including conventional techniques or techniques that may be developed in the future.

Figure 8:
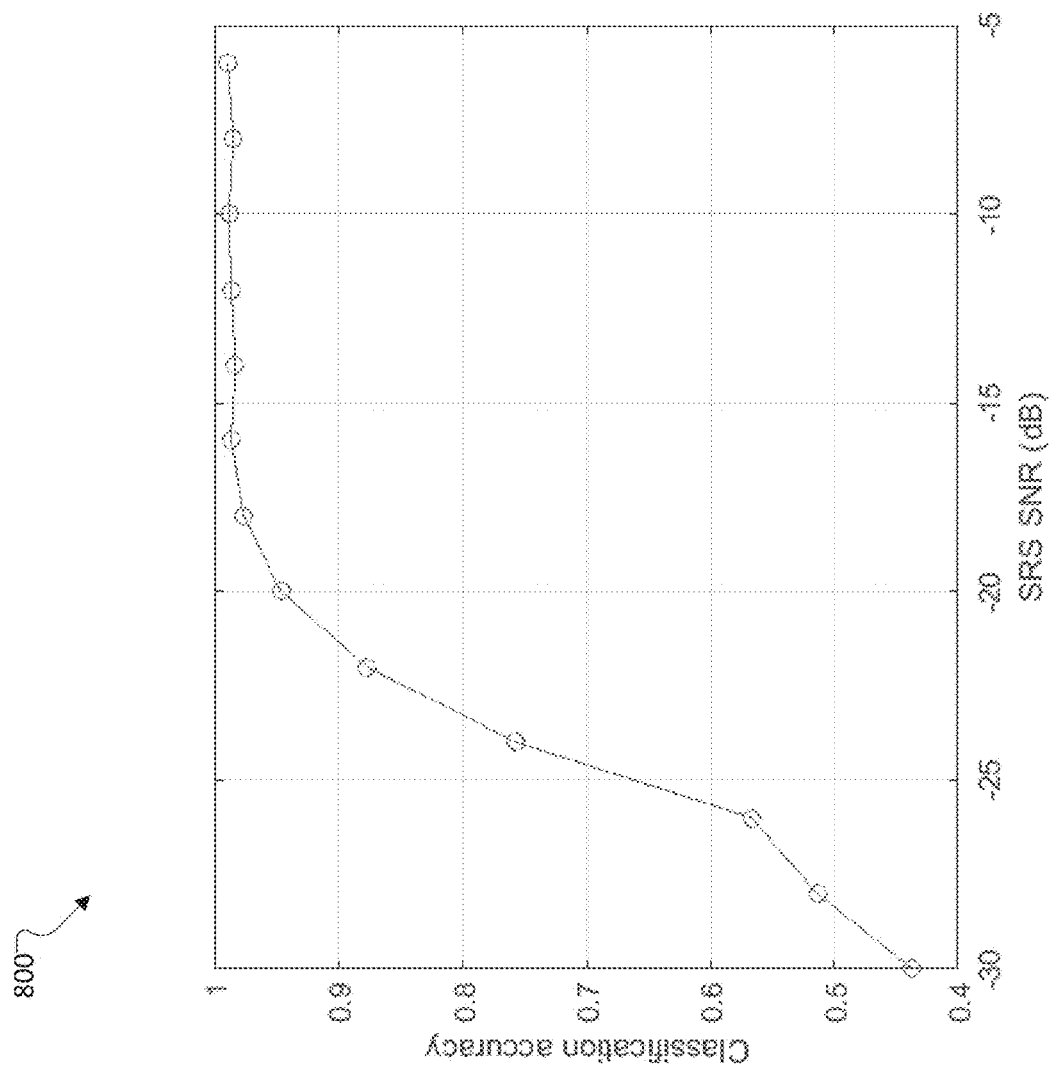
FIGS. 8 and 9 illustrate charts showing example benefits that can be realized using the embodiments of the present disclosure.
Figure 9:
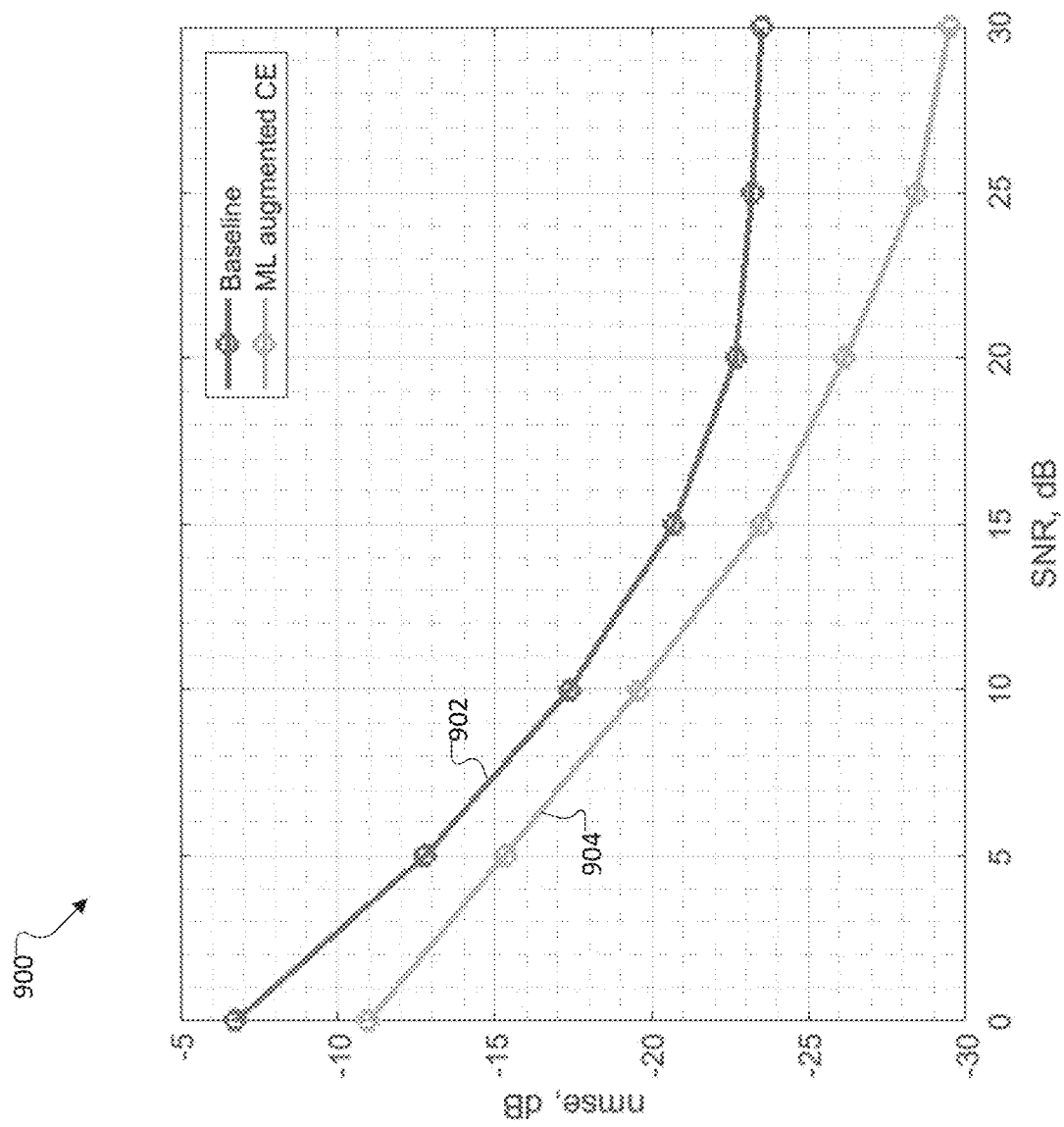

FIGS. 8 and 9 illustrate charts 800, 900 showing example benefits that can be realized using the embodiments disclosed herein. In particular, the charts 800, 900 demonstrate the feasibility of channel clustering, and the performance of applying common estimation coefficients for a class of channel in a test scenario of frequency-domain joint estimation.

In the test scenario, random realized channels profiles were generated for TDL-A, B, and C types of channel respectively. In each realization, four hundred time evolutions were simulated, and SNR ranging from −30 to −5 dB was injected. In the offline training process 510, the channels were classified into three channel profiles (TDL-A, B, and C) with different delay spreads and speeds. In the online computation process 530, the classifier was tested under different SNRs, as illustrated in FIG. 8. From FIG. 8, it can be observed that when the SRS SNR is greater than −20 dB, the three types of channel profiles can be classified with >90% accuracy, and in a typical SRS operation SNR range, the probability of properly classifying channel profiles is more than 95%.

The channel estimation performance was then evaluated when applying a common set of estimation coefficients to a class of channels. In FIG. 9, one hundred random realized TDL-B channel profiles were simulated for each SNR. At each SNR value, all channel realizations were estimated using the coefficients corresponding to an 'average' TDL-B profile. Compared to an existing (conventional) baseline technique 902, the plot 904 reflecting the process using the framework 500 shows a 2 to 5 dB gain.

Although FIGS. 5 through 9 illustrate an example framework 500 for performing AI augmented channel estimation and related details, various changes may be made to FIGS. 5 through 9. For example, various components in FIGS. 5 through 9 could be combined, further subdivided, or omitted and additional components could be added according to particular needs. In addition, various operations in FIGS. 5 through 9 could overlap, occur in parallel, occur in a different order, or occur any number of times.

Figure 10:
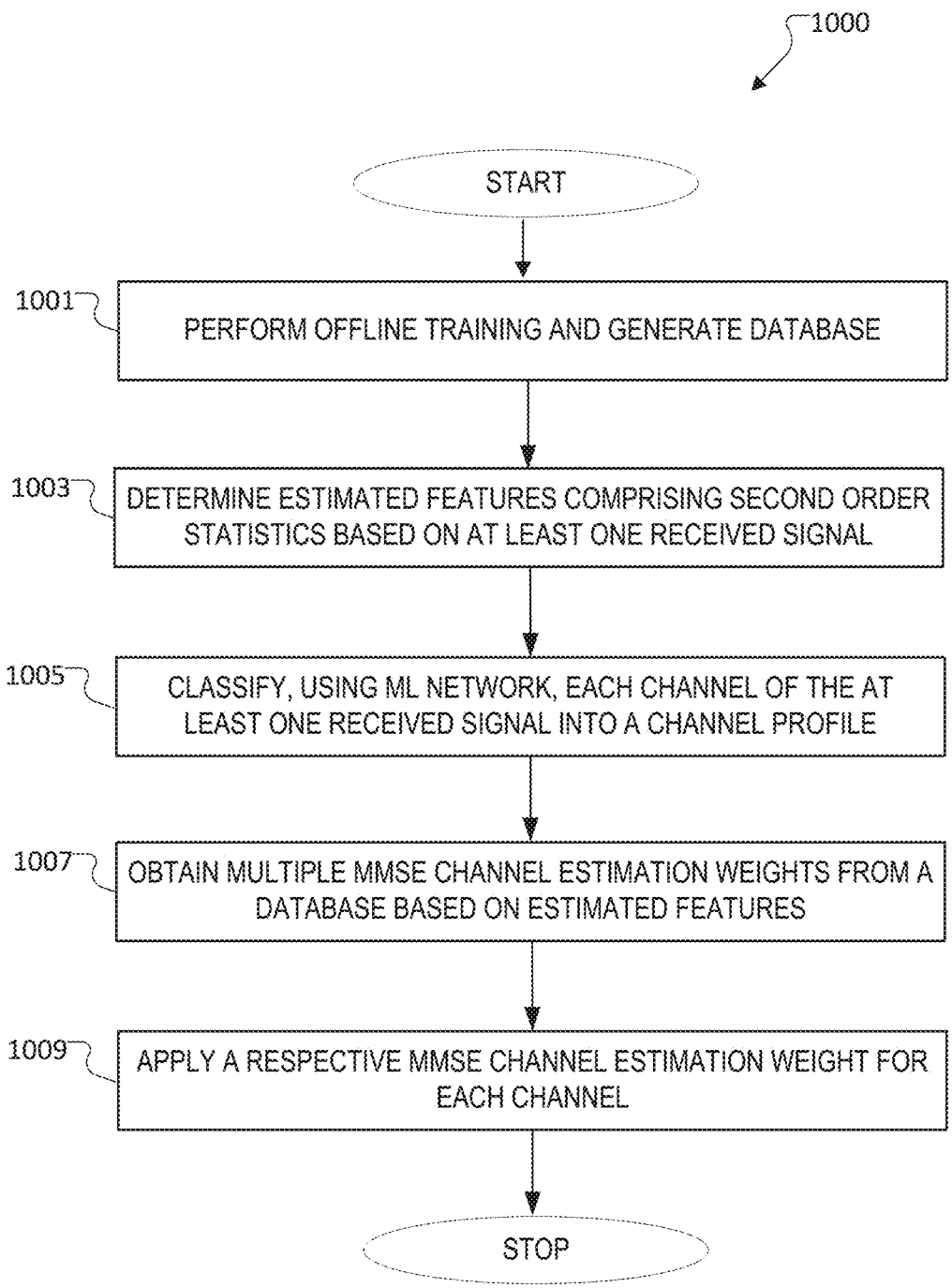
FIG. 10 illustrates a method for AI augmented channel estimation according to embodiments of the present disclosure.

FIG. 10 illustrates a method 1000 for AI augmented channel estimation according to embodiments of the present disclosure, as may be performed by one or more components of the network 100 (e.g., the gNB 102). The embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

As illustrated in FIG. 10, the method 1000 begins at step 1001. At step 1001, a gNB performs an offline training process and generates a database. This could include, for example, the gNB 102 performing the offline training process 510, during which the database 520 is generated.

At step 1003, the gNB determines estimated features comprising second order statistics based on at least one received signal. This could include, for example, the gNB 102 performing the feature estimation process 532 to determine estimated features comprising second order statistics (e.g., covariance matrix, cross-correlation matrix, ACF, SNR, and the like) based on noisy channel estimates from at least one received signal.

At step 1005, the gNB uses a machine learning network to classify each channel of the at least one received signal into a channel profile based on the estimated features. This could include, for example, the gNB 102 performing the channel classification process 534 to classify each observed channel of the received signal into one or more channel profiles.

At step 1007, the gNB obtains MMSE channel estimation weights from a database based on the estimated features. The database stores (i) representative MMSE estimation weights and (ii) channel cluster representatives indexed by the estimated features. This could include, for example, the gNB 102 using the determined channel profile and the database 520 to determine the MMSE channel estimation weights 536 that correspond to the determined channel profile and the estimated features.

At step 1009, the gNB applies a respective MMSE channel estimation weight for each channel. This could include, for example, the gNB 102 performing the MMSE channel estimation 540 in which the respective MMSE channel estimation weight is applied for each channel.

Although FIG. 10 illustrates one example of a method 1000 for AI augmented channel estimation, various changes may be made to FIG. 10. For example, while shown as a series of steps, various steps in FIG. 10 could overlap, occur in parallel, occur in a different order, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
   determining estimated features comprising second order statistics based on at least one received signal;
   classifying, using a machine learning network, each channel of the at least one received signal into a channel profile based on the estimated features;
   obtaining, from a database storing (i) representative minimum mean square error (MMSE) estimation weights and (ii) channel cluster representatives indexed by the estimated features, multiple MMSE channel estimation weights corresponding with the stored representative MMSE estimation weights and the estimated features; and
   applying a respective MMSE channel estimation weight for each channel.

2. The method of claim 1, wherein determining the estimated features comprising the second order statistics based on the at least one received signal comprises:
   determining noisy channel estimates from the at least one received signal; and
   computing the estimated features based on the noisy channel estimates.

3. The method of claim 2, wherein the noisy channel estimates comprise noisy sounding reference signals (SRS).

4. The method of claim 1, wherein the second order statistics comprise at least two of a covariance matrix, a cross-correlation matrix, an auto-correlation function (ACF), and a signal-to-noise ratio (SNR).

5. The method of claim 1, wherein the channel profile is based on at least one of a power delay profile and an angular spread profile.

6. The method of claim 1, wherein the machine learning network is trained by:
   generating a training channel data set comprising frequency domain response information for multiple channel profiles;
   classifying the multiple channel profiles into channel clusters;
   computing the representative MMSE estimation weights for each of the channel clusters; and
   storing the representative MMSE estimation weights in the database.

7. The method of claim 6, wherein the multiple channel profiles are classified into the channel clusters based on an auto-correlation function (ACF) similarity between the multiple channel profiles.

8. The method of claim 6, wherein classifying each channel of the at least one received signal into the channel profile based on the estimated features comprises:
   when a maximum correlation between that channel and any of the multiple channel profiles is less than a first threshold and greater than a second threshold, classifying that channel based on a linear combination of two or more of the multiple channel profiles.

9. A device comprising:
   a transceiver; and
   a processor operably connected to the transceiver, the processor configured to:
   determine estimated features comprising second order statistics based on at least one received signal;
   classify, using a machine learning network, each channel of the at least one received signal into a channel profile based on the estimated features;
   obtain, from a database storing (i) representative minimum mean square error (MMSE) estimation weights and (ii) channel cluster representatives indexed by the estimated features, multiple MMSE channel estimation weights corresponding with the stored representative MMSE estimation weights and the estimated features; and
   apply a respective MMSE channel estimation weight for each channel.

10. The device of claim 9, wherein to determine the estimated features comprising the second order statistics based on the at least one received signal, the processor is configured to:
    determine noisy channel estimates from the at least one received signal; and
    compute the estimated features based on the noisy channel estimates.

11. The device of claim 10, wherein the noisy channel estimates comprise noisy sounding reference signals (SRS).

12. The device of claim 9, wherein the second order statistics comprise at least two of a covariance matrix, a cross-correlation matrix, an auto-correlation function (ACF), and a signal-to-noise ratio (SNR).

13. The device of claim 9, wherein the channel profile is based on at least one of a power delay profile and an angular spread profile.

14. The device of claim 9, wherein to train the machine learning network, the processor is configured to:
- generate a training channel data set comprising frequency domain response information for multiple channel profiles;
- classify the multiple channel profiles into channel clusters;
- compute the representative MMSE estimation weights for each of the channel clusters; and
- store the representative MMSE estimation weights in the database.

15. The device of claim 14, wherein the multiple channel profiles are classified into the channel clusters based on an auto-correlation function (ACF) similarity between the multiple channel profiles.

16. The device of claim 14, wherein to classify each channel of the at least one received signal into the channel profile based on the estimated features, the processor is configured to:
- when a maximum correlation between that channel and any of the multiple channel profiles is less than a first threshold and greater than a second threshold, classify that channel based on a linear combination of two or more of the multiple channel profiles.

17. A non-transitory computer readable medium comprising program code that, when executed by a processor of a device, causes the device to:
- determine estimated features comprising second order statistics based on at least one received signal;
- classify, using a machine learning network, each channel of the at least one received signal into a channel profile based on the estimated features;
- obtain, from a database storing (i) representative minimum mean square error (MMSE) estimation weights and (ii) channel cluster representatives indexed by the estimated features, multiple MMSE channel estimation weights corresponding with the stored representative MMSE estimation weights and the estimated features; and
- apply a respective MMSE channel estimation weight for each channel.

18. The non-transitory computer readable medium of claim 17, wherein the program code that causes the device to determine the estimated features comprising the second order statistics based on the at least one received signal, comprises program code that causes the device to:
- determine noisy channel estimates from the at least one received signal; and
- compute the estimated features based on the noisy channel estimates.

19. The non-transitory computer readable medium of claim 18, wherein the noisy channel estimates comprise noisy sounding reference signals (SRS).

20. The non-transitory computer readable medium of claim 17, wherein the second order statistics comprise at least two of a covariance matrix, a cross-correlation matrix, an auto-correlation function (ACF), and a signal-to-noise ratio (SNR).

* * * * *